May 8, 1923.
G. H. THOMAS
FLEXIBLE COUPLING
Filed Dec. 31, 1921
1,454,087
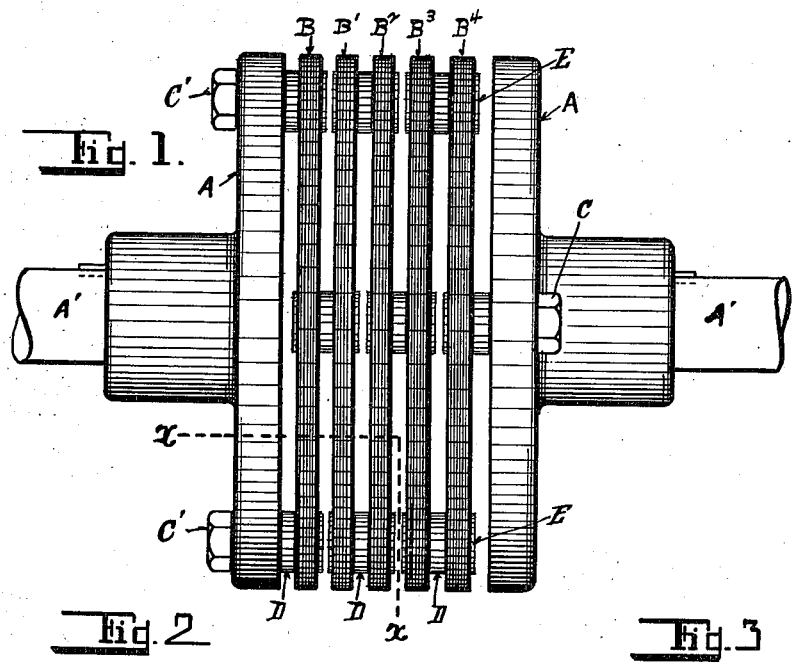
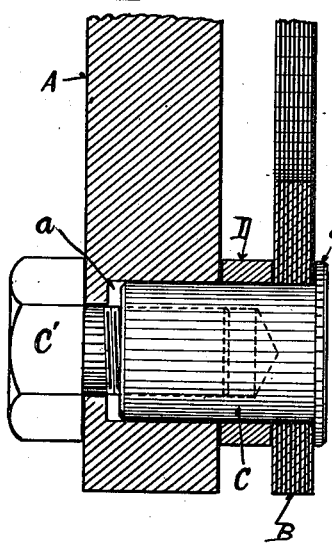
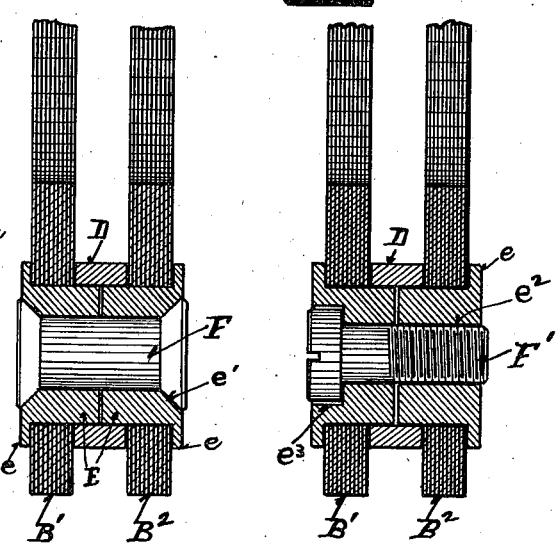
Inventor.
George H. Thomas Patented May 8, 1923.

1,454,087

UNITED STATES PATENT OFFICE.

GEORGE H. THOMAS, OF WESTFIELD, NEW YORK.

FLEXIBLE COUPLING.

Original application filed May 6, 1918, Serial No. 232,819. Divided and this application filed December 31, 1921. Serial No. 526,353.

*To all whom it may concern:*

Be it known that I, GEORGE H. THOMAS, a citizen of the United States, residing at Westfield, in the county of Chautauqua and State of New York, have invented certain new and useful Improvements in Flexible Couplings; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

This invention relates to flexible shaft couplings in which the flexible element consists of a series of flat metallic rings, each ring consisting of laminations composed of a plurality of thin metallic rings cut from sheet metal. My invention relates particularly to means for securing said laminated rings to the body flanges of the coupling, and for securing said laminated rings together in pairs as is hereinafter particularly shown and described; this application being a divisional application of my prior application, Serial Number 232,819, filed May 6, 1918; the subject matter of the present application having been cancelled out of said prior application by amendment dated June 17, 1920.

The objects of my invention are to provide means for firmly securing adjacent rings together, and to the coupling bodies, so that there will be no movement of said rings in the fastenings, so that said fastenings cannot work loose during the operation of the coupling.

The features of my invention are hereinafter explained and pointed out, and are illustrated in the accompanying drawings in which:

Figure 1, is a side elevation of a flexible shaft coupling embodying my invention.

Figure 2, is a vertical section of a fragment thereof, indicated by the broken line $x$—$x$ in Fig. 1.

Figure 3, is a like view showing an alternative construction.

In these drawings A A indicate duplicate coupling body flanges keyed upon shaft ends $A'$, $A'$; $B'$, $B^2$, $B^3$ and $B^4$ indicate a series of laminated rings, the ring B being secured to the left hand flange A, by means of my improved fastening, at diametrically opposite points, the rings $B'$ and $B^2$, $B^3$ and $B^4$ being secured together in pairs by means of my improved fastenings in line with the fastenings of the ring B with the left hand flange A, while the rings B and $B'$, $B^2$ and $B^3$, $B^4$ and the right hand flange A are secured together by means of my improved fastening at diametrically opposite points, which points are on a line midway between the fastenings of the ring B and left hand flange A, so that any relative angularity of the two flanges A A is compensated for by the flexibility of the laminated rings B to $B^4$ inclusive.

In constructing the fastenings of the rings B to $B^4$ inclusive, the rings are provided with four diametrically opposite holes equally spaced. In the rings B and $B^4$ at diametrically opposite points I place two posts C, which are provided with flat heads $c$ to engage the ring B. The posts C are provided with central screw threaded openings into which the tap screws $C'$ are screwed as hereinafter described.

The flanges A are provided with counterbored holes $a$ at diametrically opposite points, into which holes $a$ the posts C are forced; said posts fitting tightly into the counter-bored holes $a$ in the flanges A, and said tap screws $C'$ are put in place, which draw the rings B and $B^4$ toward the flanges A until the spacer rings D firmly engage the rings B and $B^4$ and flanges A.

The fastenings for the adjacent intermediate rings are duplicates of each other, and consist preferably of duplicate thimbles E E (see Fig. 2) which are provided on their outer ends with radial flanges $e$; the body portion of the thimble E being long enough to extend through one of the rings $B'$ and half way across the space between a pair of said rings $B'$ and $B^2$. These thimbles E fit snugly into holes provided therefor in said rings $B'$ and $B^2$, and are provided with central longitudinal openings therethrough, the outer terminals of which are preferably counter-sunk as indicated by $e'$. Upon the inwardly projecting ends of the thimbles E, and between the rings $B'$ and $B^2$, I place spacer rings D, which overlap the meeting joint between the two thimbles, and snugly fit thereon; and I then secure said thimbles E together, preferably by means of a rivet F, which, if put in and headed up while hot, draws the two thimbles firmly together and securely clamps the rings B' and B² between the flange e of the thimbles and the spacer ring D.

In the alternative construction shown in Fig. 3, one of the thimbles E is provided with a screw threaded opening $e^2$, and the thimbles are secured together by means of a cap-screw F', the head thereof entering into the counter bored opening $e^3$.

From the foregoing description and the drawings, the construction and operation of my invention will be obvious to those skilled in the art, and further description thereof is therefore deemed unnecessary.

Having thus fully shown and described my invention so that others can utilize the same, I do not desire to be limited to the exact construction shown and described, as many alterations and modifications can be made therein without departing from the scope of my invention. Therefore what I claim as new and desire to secure by Letters Patent is:

1. In a flexible coupling, a flexible element comprised of a plurality of flexible rings, in which adjacent rings are secured together at diametrically opposite points, the successive pairs of fastenings being in successive staggered relation, a coupling body at each side of said flexible element, said bodies being provided with openings therethrough at diametrically opposite points, posts in the outermost rings of said flexible element and entering said counter bored openings, spacer rings on said posts between said outermost rings and coupling bodies, and means to retain said posts in said openings.

2. In a flexible shaft coupling, a pair of flexible rings having transverse openings therethrough, thimbles in said openings having central openings therethrough, flanges on the outer ends of said thimbles engaging said flexible rings, a spacer ring between said flexible rings overlapping the joint between said thimbles, and means to secure said thimbles together.

3. In a flexible shaft coupling, a pair of flexible rings having transverse openings therethrough, thimbles in said openings having central openings therethrough, flanges on the outer ends of said thimbles engaging said flexible rings, a spacer ring between said flexible rings overlapping the joint between said thimbles, and a rivet passing said thimbles.

In testimony whereof I affix my signature.

GEORGE H. THOMAS.